G. B. BELL.
VEHICLE WHEEL.
APPLICATION FILED FEB. 8, 1921.

1,399,331.

Patented Dec. 6, 1921.

Inventor:
George B. Bell.
by his atty.
Charles S. Gooding

UNITED STATES PATENT OFFICE.

GEORGE B. BELL, OF CAMBRIDGE, MASSACHUSETTS, ASSIGNOR TO SARAH L. BELL, OF CAMBRIDGE, MASSACHUSETTS.

VEHICLE-WHEEL.

1,399,331.  Specification of Letters Patent.  Patented Dec. 6, 1921.

Application filed February 8, 1921. Serial No. 443,323.

*To all whom it may concern:*

Be it known that I, GEORGE B. BELL, a citizen of the United States, residing at Cambridge, in the county of Middlesex and State of Massachusetts, have invented new and useful Improvements in Vehicle-Wheels, of which the following is a specification.

This invention relates to an improvement in vehicle wheels.

The object of the invention is to provide a vehicle wheel having a tire constructed of a helical spring, said spring being mounted upon a rim formed in two parts to provide a peripheral groove extending circumferentially around the felly of said wheel, each of the parts of said rim having corrugations formed thereon in which the convolutions of the helical spring may rest, thereby preventing a circumferential movement of said spring upon said rim. The invention is an improvement on the device illustrated and described in the United States Letters Patent No. 1,036,065, dated August 20, 1912.

The invention consists in the combination and arrangement of parts set forth in the following specification and particularly pointed out in the claims thereof.

Referring to the drawings.

Like numerals refer to like parts throughout the several views of the drawings.

Figure 1:
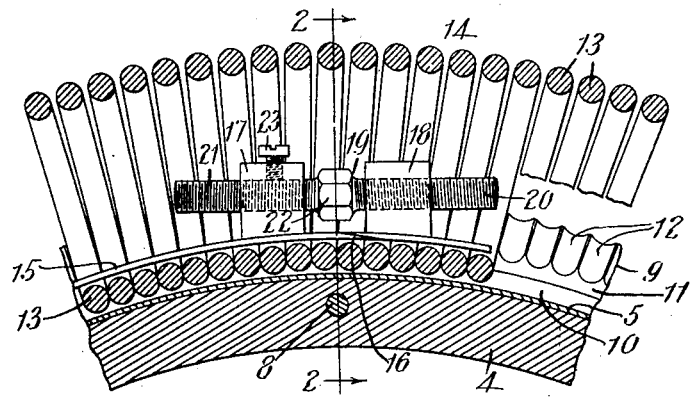
Figure 1 represents a vertical section partly in elevation taken on the line 1—1 of Fig. 2.

In the drawings, 4 represents a felly of a vehicle wheel and 5 the felly band. Fastened to the felly 4 is a tire carrying rim 6 constructed of resilient sheet material and formed in two similar parts, said parts being fastened to the felly upon opposite sides thereof simultaneously by bolts 8. Each of the parts 7 has a flange 9 formed integral therewith which extends outwardly from the felly 4 and coöperates therewith to form a peripheral groove 10 which extends circumferentially around said felly. Securely fastened in any desired manner, as, for example, by welding, to the inner surface of each of the flanges 9 is a strip 11 having corrugations 12 formed thereon in which the convolutions 13 of a helical spring 14 are seated. The helical spring 14 constitutes a tire for the vehicle wheel and extends circumferentially around the felly 4 within the groove 10 being supported upon the flanges 9 of the parts 7 of the rim 6, each convolution 13 being seated upon opposite sides of the center thereof in a separate corrugation 12.

The helical spring 14 is retained within the groove 10 with the convolutions thereof seated in the corrugations 12 by a strap 15 which is located within said spring and extends entirely therearound, the opposite ends of said strap being beveled and overlapping each other at 16 where the ends unite. Lugs 17 and 18 are fast to the strap 15 adjacent to the opposite ends thereof and said ends are drawn together by a screw 19. one end of which is provided with a right hand screw-threaded portion 20 which has screw-threaded engagement with the lug 18 and the other end of which is provided with a left hand screw-threaded portion 21 which has screw-threaded engagement with the lug 17. The central portion of the screw 19 has a hexagonal portion 22 which may be engaged by a suitable wrench at such times as it is desired to rotate the screw. When the ends of the strap 15 are drawn together as illustrated in Fig. 1, the convolutions 13 of the helical spring 14 will all be held securely in the corrugations 12 and said spring will be prevented from slipping circumferentially within the groove 10. A set screw 23 located in the lug 17 prevents the screw 19 from rotating when set against said screw 19 after the latter has been properly adjusted.

The helical spring 14 constituting the tire may be attached to or detached from the wheel at any time without disturbing the adjustment of the screw 19 by removing the nuts from the bolts 8, and then removing the portion 7 of the rim 6 adjacent to said nuts and slipping said spring sidewise into or out of position. When the spring 14 is in position the strap 15 prevents said spring from expanding and, therefore, holds the convolutions 13 of said spring in the corrugations 12 therefore preventing the spring of said spring from moving circumferentially within the groove 10.

Figure 4:
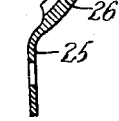
Fig. 4 is a sectional view illustrating a modified construction of one of the portions of the tire carrying rim.

In Fig. 4 is illustrated a modified embodiment of the portion 7 of the tire carrying rim 6 in which a portion 25 has an outwardly extending flange 26 formed integral therewith, said flange having corrugations 27 also formed integral therewith. A rim constructed of two similar portions 25 is used in a similar manner to the rim 6 and performs all of the functions of the latter rim.

Figure 2:
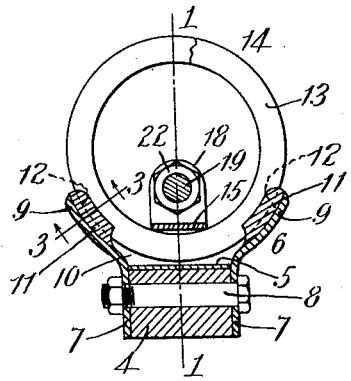
Fig. 2 is a transverse section taken on the line 2—2 of Fig. 1.
Figure 5:
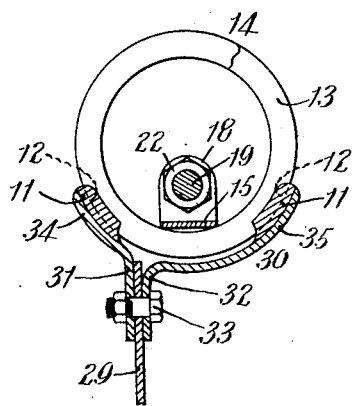
Fig. 5 is a transverse section similar to Fig. 2 illustrating another modified embodiment of my invention.
Figure 3:
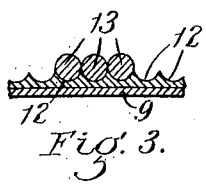
Fig. 3 is a detail section taken on the line 3—3 of Fig. 2.

In Fig. 5 is illustrated still another modified embodiment of my invention in which 29 represents the disk of a Disteel Wheel or all steel wheel. The disk 29 corresponds to the felly 4 of the embodiment illustrated in Figs. 1 and 2. Fastened to the disk 29 is a tire carrying rim 30 constructed in two parts 31 and 32, said parts being fastened to the opposite surfaces of the disk 29 by means of bolts 33. The parts 31 and 32 have flanges 34 and 35 respectively formed integral therewith to the inner surfaces of which strips 11 are fastened as previously described, said strips having corrugations 12 formed thereon in which the convolutions 13 of the helical spring 14 are seated. The spring 14 is fastened to the rim 30 in exactly the same manner as previously described in connection with the device of Figs. 1 and 2, performing all the functions of the before mentioned rim and being attached to and detached from said rim as previously described.

I claim:

1. A vehicle wheel embodying therein a felly, a rim constructed in two parts fast to said felly and coöperating therewith to form a peripheral groove extending therearound, a helical spring extending around said rim and supported by the latter within said groove, said rim being provided with corrugations formed thereon adapted to prevent a circumferential movement of said helical spring upon said rim and means to hold said helical spring within said groove and corrugations.

2. A vehicle wheel embodying therein a felly, a rim fast to said felly and coöperating therewith to form a peripheral groove extending therearound, said rim being provided with corrugations formed thereon, a helical spring extending circumferentially around said rim, said spring being supported by said rim within said groove and seated within said corrugations and means for retaining said helical spring within said groove and corrugations.

3. A vehicle wheel embodying therein a felly, a resilient rim constructed in two parts fast to the opposite sides of said felly and coöperating therewith to form a peripheral groove extending therearound, the parts of said rim each being provided with corrugations formed thereon, a helical spring extending around said rim within said groove, said spring being supported by said rim within said corrugations and means for retaining said helical spring within said groove and corrugations.

4. A vehicle wheel embodying therein a felly, a resilient rim constructed in two parts fast to the opposite sides of said felly, each of said parts embodying therein a flange, said flanges coöperating with said felly to form a peripheral groove extending around said felly, a strip fast to each of said flanges provided with corrugations formed thereon, a helical spring extending around said rim within said groove and seated in said corrugations and means for retaining said helical spring within said groove and corrugations.

In testimony whereof I have hereunto set my hand in presence of two subscribing witnesses.

GEORGE B. BELL.

Witnesses:
 FRANKLIN E. LOW,
 KATHRYN M. JOYCE.